United States Patent
Lemay et al.

(10) Patent No.: US 10,235,301 B2
(45) Date of Patent: Mar. 19, 2019

(54) DYNAMIC PAGE TABLE EDIT CONTROL

(71) Applicant: INTEL CORPORATION, Santa Clara, CA (US)

(72) Inventors: Michael Lemay, Hillsboro, OR (US); David M. Durham, Beaverton, OR (US); Andrew V. Anderson, Forest Grove, OR (US); Gilbert Neiger, Hillsboro, OR (US); Ravi L. Sahita, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 50 days.

(21) Appl. No.: 15/652,028

(22) Filed: Jul. 17, 2017

(65) Prior Publication Data
US 2017/0315926 A1 Nov. 2, 2017

Related U.S. Application Data

(63) Continuation of application No. 14/750,982, filed on Jun. 25, 2015, now Pat. No. 9,710,393.

(51) Int. Cl.
*G06F 9/455* (2018.01)
*G06F 12/1009* (2016.01)
(Continued)

(52) U.S. Cl.
CPC ...... *G06F 12/1009* (2013.01); *G06F 9/45558* (2013.01); *G06F 12/1027* (2013.01);
(Continued)

(58) Field of Classification Search
None
See application file for complete search history.

(56) References Cited

U.S. PATENT DOCUMENTS

| 6,199,181 B1 | 3/2001 | Rechef et al. |
| 6,397,242 B1 | 5/2002 | Devine et al. |

(Continued)

FOREIGN PATENT DOCUMENTS

| WO | 2011011769 A1 | 1/2011 |
| WO | 2014209269 A1 | 12/2014 |

OTHER PUBLICATIONS

Barham, et al., "Xen and the Art of Virtualization," SOSP'03, ACM 1-58113-757-5/03/0010, Oct. 19-22, 2003, 14 pages.
(Continued)

*Primary Examiner* — Brian R Peugh
(74) *Attorney, Agent, or Firm* — Grossman, Tucker, Perreault & Pfleger, PLLC

(57) ABSTRACT

Generally, this disclosure provides systems, methods and computer readable media for a page table edit controller configured to control access to guest page tables by virtual machine (VM) guest software through the manipulation of extended page tables. The system may include a translation look-aside buffer (TLB) to maintain a policy to lock one or more guest linear addresses (GLAs) to one or more allowable guest physical addresses (GPAs); a page walk processor to update the TLB based on the guest page tables; and a page table edit control (PTEC) module to: identify entries of the guest page tables that map GLAs associated with the policy to a first GPA; verify that the mapping conforms to the policy; and place the guest page table into one of a plurality of restricted accessibility states based on the verification, the restricted accessibility applied to the VM guests and to the page walk processor.

20 Claims, 11 Drawing Sheets

(51) Int. Cl.
  *G06F 12/1027* (2016.01)
  *G06F 12/14* (2006.01)
  *G06F 21/00* (2013.01)
  *G06F 21/53* (2013.01)

(52) U.S. Cl.
  CPC .......... *G06F 12/1483* (2013.01); *G06F 21/00* (2013.01); *G06F 21/53* (2013.01); *G06F 9/45533* (2013.01); *G06F 2009/45583* (2013.01); *G06F 2009/45587* (2013.01); *G06F 2212/1024* (2013.01); *G06F 2212/1052* (2013.01); *G06F 2212/151* (2013.01); *G06F 2212/651* (2013.01); *G06F 2212/657* (2013.01); *G06F 2212/68* (2013.01); *G06F 2221/2141* (2013.01)

(56) References Cited

U.S. PATENT DOCUMENTS

| | | | |
|---|---|---|---|
| 8,364,932 | B2 | 1/2013 | Ali et al. |
| 8,635,705 | B2 | 1/2014 | Sahita et al. |
| 8,694,738 | B2 | 4/2014 | Bhattacharjee et al. |
| 9,612,973 | B2 * | 4/2017 | Huang ................ G06F 12/1009 |
| 2011/0087822 | A1 | 4/2011 | Bennett et al. |
| 2011/0107008 | A1 | 5/2011 | Ben-Yehuda et al. |
| 2012/0191948 | A1 | 7/2012 | Day, II et al. |
| 2013/0117743 | A1 | 5/2013 | Neiger et al. |
| 2013/0117804 | A1 | 5/2013 | Chawla et al. |
| 2014/0380009 | A1 | 12/2014 | Lemay et al. |
| 2016/0253193 | A1 | 9/2016 | Tsirkin |

OTHER PUBLICATIONS

Cheng, et al., "AppShield: Protecting Applications against Untrusted Operating System," Singapore Management University School of Information Systems Technical Paper Series, SMU-SIS-13-101, 2013, 30 pages.
Evtyushkin, et al., "Iso-X: A Flexible Architecture for Hardware-Managed Isolated Execution," NPRP grant 4-1593-1-260, Qatar National Research Fund, 13 pages.
Notice of Allowance issued in U.S. Appl. No. 141750,982, dated Mar. 27, 2017, 13 pages.
Wu, et al, "Taming Hosted Hypervisors with (Mostly) Depriviledged Execution," Department of Computer Science,North Carolina State University; Department of Computer Science, Florida State University, Feb. 2013, 15 pages.
Wartell, et al., "Binary Stirring: Self-randomizing Instruction Addresses of Legacy x86 Binary Code," Department of Computer Science, The University of Texas at Dallas, Oct. 16-18, 2012, 12 pages.
Bovet, et al., "Understanding the Linux Kernel," 3rd Edition, 2006, 944 pages.
International Search Report and Written Opinion from related application PCT/2013/047381 dated Mar. 25, 2014, 9 pages.
International Preliminary Report on Patentability from related application PCT/2013/047381 dated Dec. 29, 2015, 7 pages.
Intel 64 and IA-32 Architectures Software Developer's Manual, vol. 3 (3A, 3B & 3C), System Programming Guide, Mar. 2013, part 1 of 13, 100 pages.
Intel 64 and IA-32 Architectures Software Developer's Manual, vol. 3 (3A, 3B & 3C) System Programming Guide, Mar. 2013, part 2 of 13, 101 pages.
Intel 64 and IA-32 Architectures Software Developer's Manual, vol. 3 (3A, 3B & 3C) System Programming Guide, Mar. 2013, part 3 of 13, 101 pages.
Intel 64 and IA-32 Architectures Software Developer's Manual, vol. 3 (3A, 3B & 3C) System Programming Guide, Mar. 2013, part 4 of 13, 101 pages.
Intel 64 and IA-32 Architectures Software Developer's Manual, vol. 3 (3A, 3B & 3C) System Programming Guide, Mar. 2013, part 5 of 13, 101 pages.
Intel 64 and IA-32 Architectures Software Developer's Manual, vol. 3 (3A, 3B & 3C) System Programming Guide, Mar. 2013, part 6 of 13, 101 pages.
Intel 64 and IA-32 Architectures Software Developer's Manual, vol. 3 (3A, 3B & 3C) System Programming Guide, Mar. 2013, part 7 of 13, 101 pages.
Intel 64 and IA-32 Architectures Software Developer's Manual, vol. 3 (3A, 3B & 3C) System Programming Guide, Mar. 2013, part 8 of 13, 101 pages.
Intel 64 and IA-32 Architectures Software Developer's Manual, vol. 3 (3A, 3B & 3C) System Programming Guide, Mar. 2013, part 9 of 13, 101 pages.
Intel 64 and IA-32 Architectures Software Developer's Manual, vol. 3 (3A, 3B & 3C) System Programming Guide, Mar. 2013, part 10 of 13, 101 pages.
Intel 64 and IA-32 Architectures Software Developer's Manual, vol. 3 (3A, 3B & 3C) System Programming Guide, Mar. 2013, part 11 of 13, 101 pages.
Intel 64 and IA-32 Architectures Software Developer's Manual, vol. 3 (3A, 3B & 3C) System Programming Guide, Mar. 2013, part 12 of 13, 101 pages.
Intel 64 and IA-32 Architectures Software Developer's Manual, vol. 3 (3A, 3B & 3C) System Programming Guide, Mar. 2013, part 13 of 13, 67 pages.
Office Action issued in U.S. Appl. No. 14/127,561, dated Apr. 20, 2016, 39 pages.
Office Action issued in U.S. Appl. No. 14/127,561, dated Apr. 7, 2017, 18 pages.
Final Office Action issued in U.S. Appl. No. 14/127,561, dated Dec. 1, 2016, 23 pages.
Final Office Action issued in U.S. Appl. No. 14/127,561, dated Oct. 5, 2017, 21 pages.

* cited by examiner

| State | Guest S/W Permissions | | PMH Access |
|---|---|---|---|
| | Read/Execute | Write | |
| Unrecognized 502 | Y | Y | Y |
| Recognized 504 | Y/N | N | N |
| Inactive 506 | Y | Y | N |
| Inactive Read-Only 508 | Y | N | N |
| Active 510 | Y | N | Y |
| Live Editable 512 | Y | Y | Y |

Maintain a policy to lock one or more guest linear addresses (GLAs) to one or more allowable guest physical addresses (GPAs)

1010

Identify entries of the guest page tables that map GLAs associated with the policy to a first GPA

1020

Verify that the mapping conforms to the policy

1030

Place the guest page table into one of a plurality of restricted accessibility states based on the verification, the restricted accessibility enforced by Extended Page Table (EPT) permissions and applied to the VM guests and to a page walk processor

DYNAMIC PAGE TABLE EDIT CONTROL

CROSS-REFERENCE TO RELATED APPLICATIONS

The present application is a continuation of U.S. patent application Ser. No. 14/750,982, now U.S. Pat. No. 9,710,393, filed on Jun. 26, 2015, the entire disclosure of which is incorporated herein by reference.

FIELD

The present disclosure relates to dynamic page table edit control, and more particularly, to a dynamic page table edit controller to control access by virtual machine guests to guest page tables.

BACKGROUND

In a virtual machine (VM) environment, one or more VM guests are hosted on a platform and may operate using multiple memory views. A memory view is a domain within a shared address space that is associated with a certain level of protection, privilege and/or security. A virtual machine monitor (VMM) may manage the guest software and operating systems and control view switching between the various software entities. This view switching may typically be accomplished by the VMM through management and updating of paging structures (e.g., page tables and extended page tables) that are configured to map or translate guest linear memory addresses to guest physical memory addresses, and ultimately to host physical memory addresses.

Security-critical software components at all privilege levels within a system generally depend on correct guest linear to guest physical address mappings. Some systems (e.g., legacy software) may allow untrusted software to modify page tables that affect those mappings. There is a need to support such legacy software while still enforcing controls on linear to physical mappings in order to provide a desired level of security.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 5 illustrates page table states consistent with an example embodiment of the present disclosure;

FIG. 10 illustrates a flowchart of operations of another example embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides systems, methods and computer readable media for a dynamic page table edit controller configured to control access to guest page tables (PTs) by virtual machine (VM) guest software through the manipulation of extended page tables (EPTs). The page table edit controller (PTEC) may be incorporated in the virtual machine monitor (VMM) or hypervisor. The PTEC may provide regulated PT access in response to PT requests/demands from both the VM guest software and the page walk processor (also referred to as a page miss handler or PMH processor), as will be described in greater detail below. The PTEC may be configured to dynamically adjust the sets of PTs that can be accessed by guest software and/or the PMH to reduce overhead that would be associated with VM exits invoked by memory access violations. In some embodiments, PT shadowing and/or PT ghosting may be employed to control guest linear address (GLA) to guest physical address (GPA) mappings. The term "shadowing," as used herein, refers to the existence of two copies or representations of the page table at different guest physical addresses. The term "ghosting," as used herein, refers to the remapping of a page table to a different guest physical address than may be expected by the guest software (which may be untrusted). In some embodiments, the shadowing may be limited to a subset of all PTs, for example only those PTs associated with security related concerns, thus avoiding the performance degradation that would be imposed by full PT shadowing.

It will be appreciated that control of address mapping, as described herein, may provide protection against a variety of security attacks. For example, remapping attacks could compromise software at any privilege level (e.g., ring level) by reordering code pages so that branches land on unintended instructions and result in unauthorized control flows. Remapping attacks could also modify the selection of data pages for use, which may cause incorrect software behavior due to causes such as the use of unauthorized data as the value of a control variable or the use of an unauthorized destination location for sensitive/confidential data that is accessible to unauthorized entities.

Figure 1:
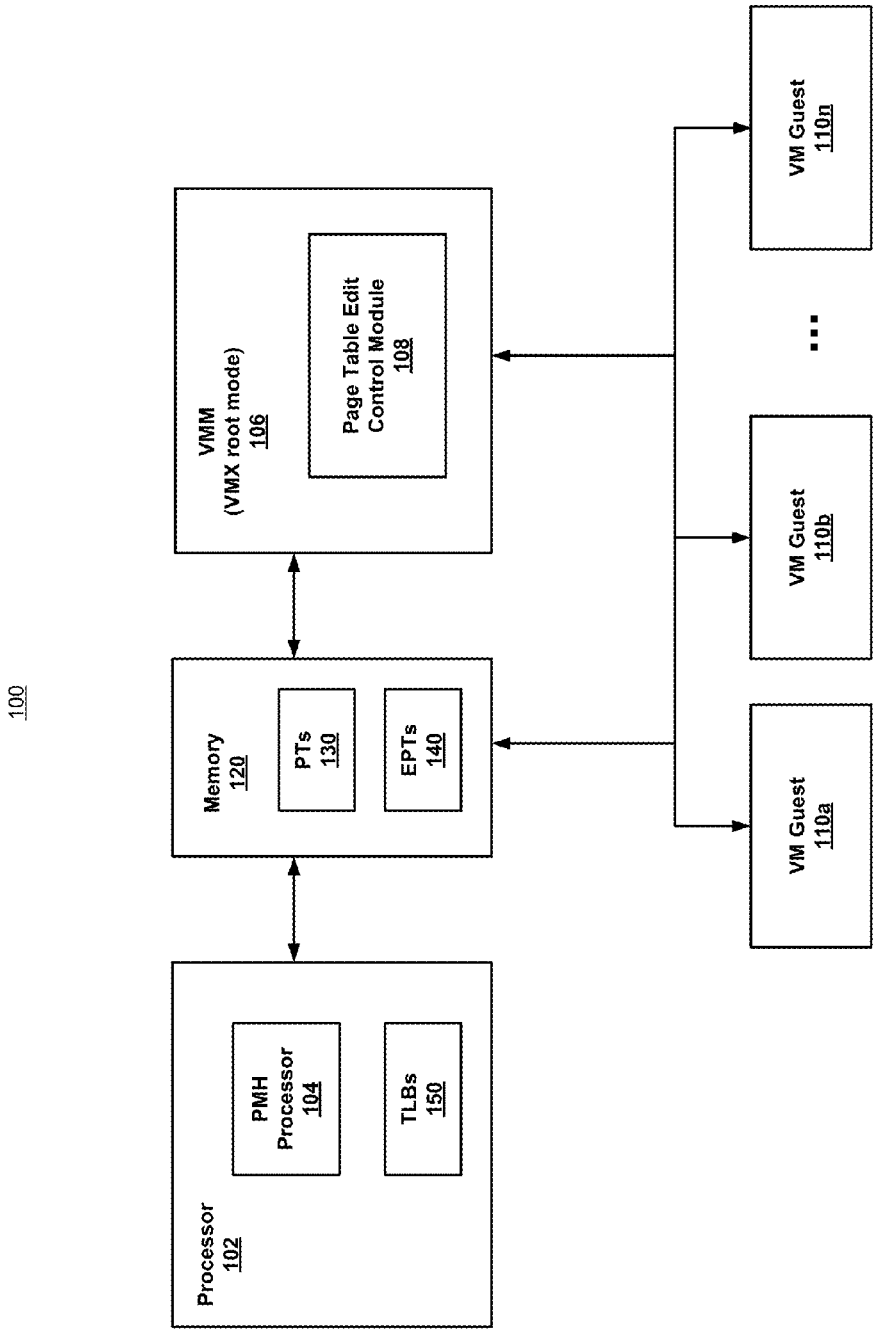
FIG. 1 illustrates a top level system diagram of one example embodiment consistent with the present disclosure.

FIG. 1 illustrates a top level system diagram 100 of one example embodiment consistent with the present disclosure. The system 100 may be a hardware platform or computing device such as, for example, a smart phone, smart tablet, personal digital assistant (PDA), mobile Internet device (MID), convertible tablet, notebook or laptop computer, desktop computer, server or any other device whether fixed or mobile. The system 100 is shown to include a processor 102. In some embodiments, processor 102 may be implemented as any number of CPUs or processor cores. The processor (or processor cores) may be any type of processor, such as, for example, a micro-processor, an embedded processor, a digital signal processor (DSP), a network processor, a field programmable gate array or other device configured to execute code. Processor 102 may be a singlethreaded core or, a multithreaded core in that it may include more than one hardware thread context (or "logical processor") per core. System 100 is also shown to include a memory module 120 coupled to the processor 120. The memory 120 may be any of a wide variety of memories (including various layers of memory hierarchy and/or memory caches) as are known or otherwise available to those of skill in the art. Page tables 130 and extended page tables 140 may be stored in memory 120.

The processor 102 may be a host processor for a virtual machine (VM) environment and memory 120 may be configured as host physical memory to be protected from direct access by VM guests 110a, 110b, . . . 110n. Host processor 102 is shown to include a page walk processor (or page handling processor, PMH) 104. PMH 104 may be an additional processor or sub-processor of any type, as previously described, configured to interpret and walk through page table structures, as will be described in greater detail below. Processor 102 is shown to also include translation look-aside buffers (TLBs) 150 configured to cache page table mappings for linear to physical address translations.

It will be appreciated that in some embodiments, the various components of the system 100 may be combined in a system-on-a-chip (SoC) architecture. In some embodiments, the components may be hardware components, firmware components, software components or any suitable combination of hardware, firmware or software.

VMM module 106 (also referred to as a hypervisor) provides management and/or hosting of one or more VM guests 110a, 110b, . . . 110n. VMM 106 generally executes in a relatively higher privileged mode (e.g., VMX root mode or the like) associated with processor 102. VM guests 110 execute in modes of lower privilege (e.g., VMX non-root mode) which may include, for example, ring 0 (or supervisor) mode and ring 3 (or user) mode. Ring 0 privilege mode is a reduced privilege mode relative to VMX root mode (i.e., the privilege mode associated with the VMM) and ring 3 privilege mode is yet a further reduced privilege mode relative to ring 0 mode.

Although VM guests may share the same host physical memory 120, the VMM protects the physical memory through EPT based mappings between guest physical memory addresses and host physical memory addresses. The EPTs provide a second layer of paging structures (below the conventional OS page table layer) that are controlled by the VMM as described in greater detail below. The VMM is also shown to include the page table edit control (PTEC) module 108 which is configured to regulate access to the guest PTs by the VM guests 110 and the PMH processor 104. The PTEC may control PT access to reduce memory access violations that would otherwise require a transition to VMX root mode through relatively less efficient VM calls and VM exits. This may improve the performance of applications/software running on the VM guests 110. In some embodiments, portions of the PTEC module logic may be implemented by trusted code operating in VMX non-root mode.

Although various embodiments of the present disclosure are described in terms of PTs and EPTs, any suitable type of nested page table structure or other hierarchical page table or other protection scheme may be employed.

As mentioned previously, some embodiments may employ multiple processors 102 or processor cores (also referred to as hardware threads), each with its own dedicated or partially or completely shared PMH processor 104 and set of TLBs 150 that share a common memory 120 including PTs 130 and EPTs 140.

Figure 2:
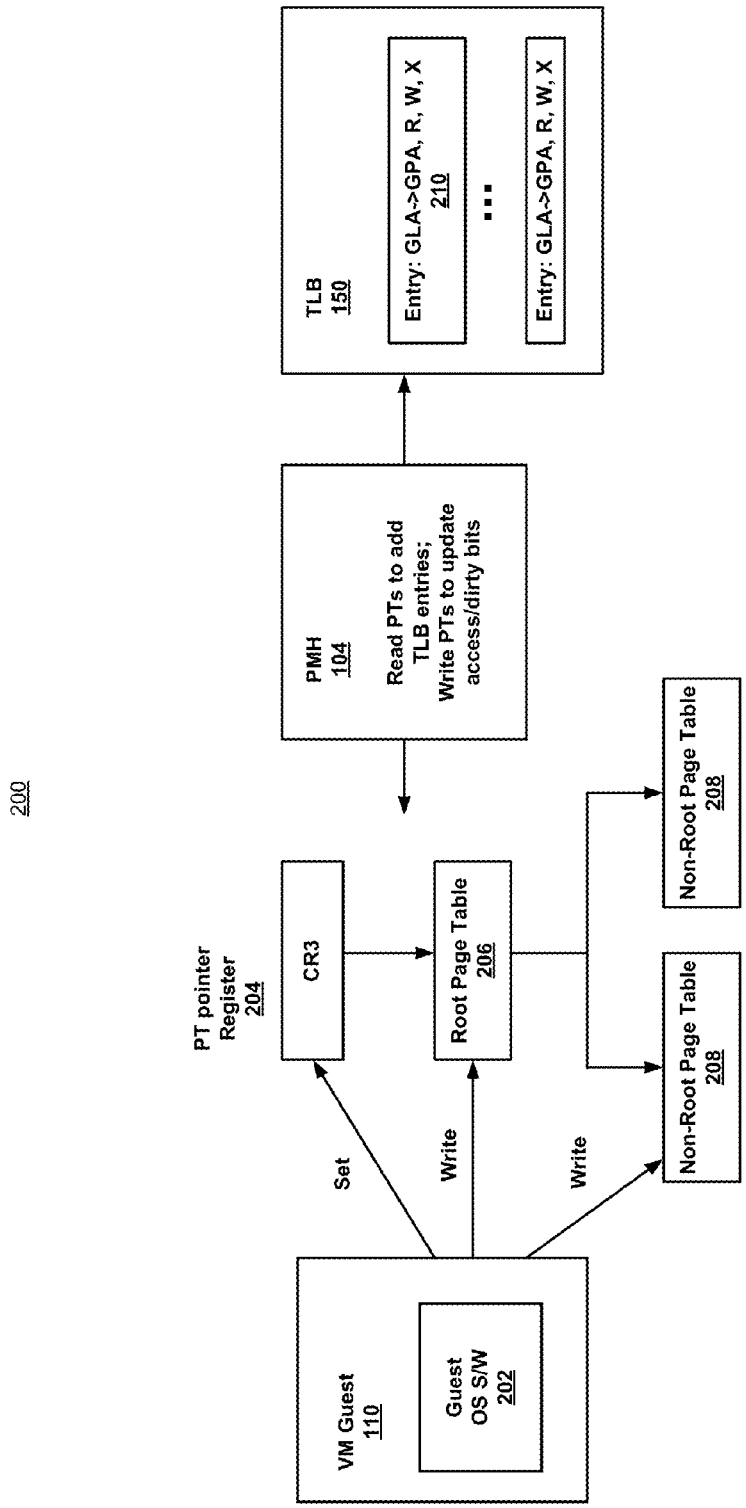
FIG. 2 illustrates a more detailed system diagram of another example embodiment consistent with the present disclosure.

FIG. 2 illustrates a more detailed system diagram 200 of another example embodiment consistent with the present disclosure. The TLB 150 may be configured to store a number of entries 210 that provide Guest Linear Address (GLA) to Guest Physical Address (GPA) mappings for use by the PMH 104. Each entry 210 may be associated with the translation of addresses within some GLA region to a GPA region of the same size, and to check the permissions of the software attempting to access the region (e.g., read, write, execute permissions—R, W, X). Before describing how the contents of the TLB 150 are controlled, it will be helpful to describe how TLB entries are added and removed in general.

The PMH 104 traverses page table structures 204, 206, 208 to obtain the information needed to add entries to the TLB 150. At times, this requires the eviction of an existing TLB entry, due to TLB capacity limitations. A TLB entry is typically only usable within a single address space, although some TLB entries are usable across multiple address spaces. Specifically, some page table entries are annotated with a "global" bit, which permits the associated TLB entry to be used across all address spaces within a particular VM and EPT view. For most paging modes, all non-global mappings are flushed (removed) when a process context switch occurs. However, some modes can optionally specify a Process-Context Identifier (PCID) from which an Address Space Identifier (ASID) is derived, so that it is not necessary to flush non-global TLB entries during a context switch.

Guest software 202 is responsible for configuring page tables in memory. Specifically, it writes data representing page table entries into regions that are aligned at memory boundaries appropriate for the paging mode in use, and updates processor control registers to activate the appropriate paging mode and inform the PMH of where the page tables are located in memory. Guest software 202 is prevented from directly accessing the TLB 150, though it is assumed that any software in the guest may potentially modify page tables (although operating systems typically prevent unprivileged software from doing so. The VMM 106 and PTEC module 108 are assumed, however, to be secure or trusted.

FIG. 2 shows only guest page tables for simplicity, but information from any second-level page tables (e.g. Extended Page Tables) that may be in use can also be incorporated into the TLB entries by the PMH. The format of the page tables is determined by the paging mode, and various formats are possible, such as, for example: two levels of page tables; three levels of page tables including a root (top) level that holds three page table entries and is cached in registers in the CPU (e.g., Intel Physical Address Extension or PAE mode); and 64-bit processor architectures that support four levels of page tables.

Figure 3:
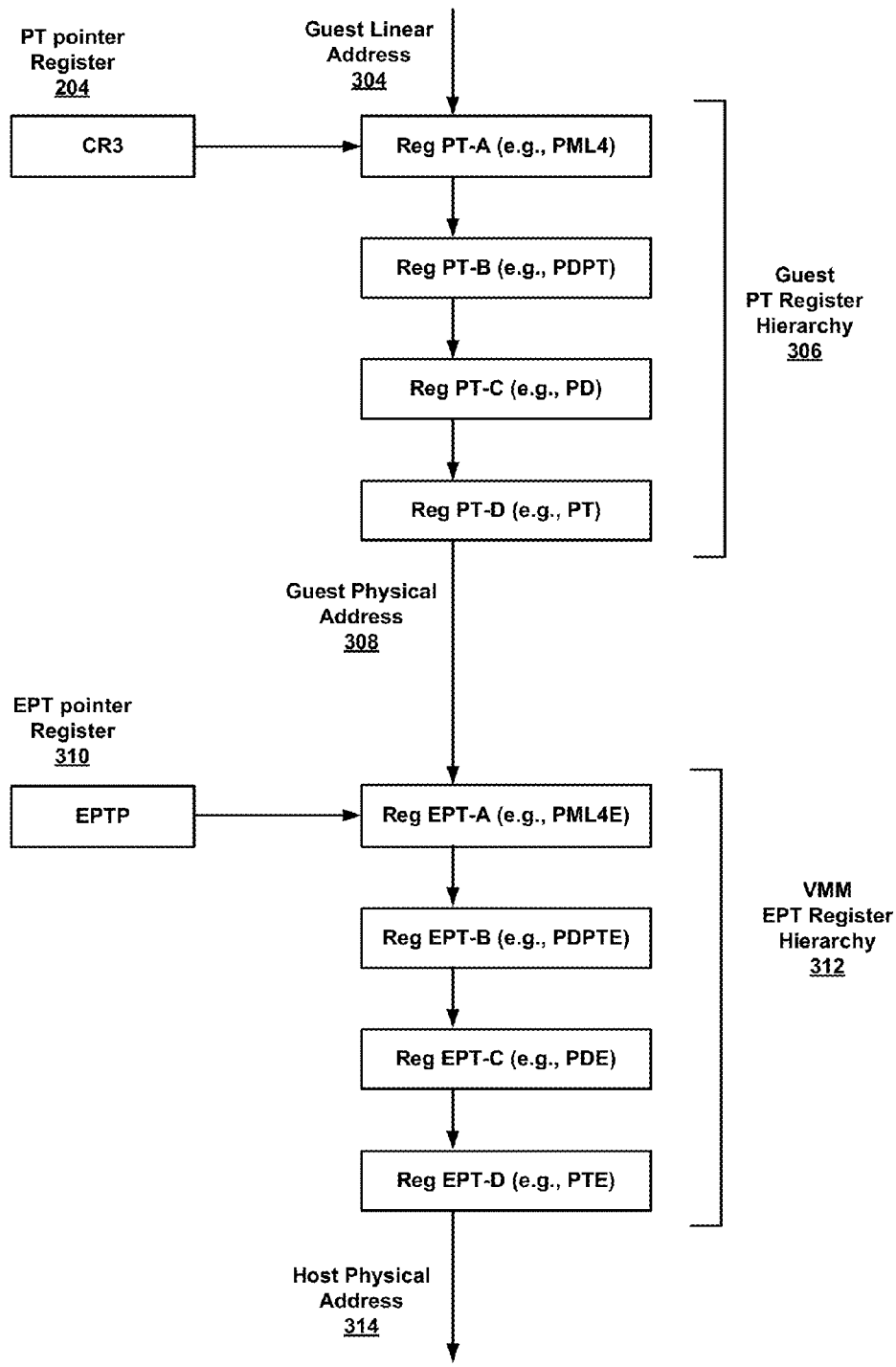
FIG. 3 illustrates a page table walk consistent with an example embodiment of the present disclosure.

FIG. 3 illustrates a page table walk 300 consistent with an example embodiment of the present disclosure. The PMH processor 104 is configured to interpret the page table structures and perform the page table walk. A guest linear address (GLA) 304 may be translated or mapped to a guest physical address (GPA) 308 in guest physical memory using a hierarchy of guest PT registers (A through D) 306, which is illustrated as a 4 level hierarchy in this example. A Page Table pointer register 204 (e.g., the CR3 register in some Intel processor architectures) may be configured to select a particular set of PTs for any given linear address mapping. In some embodiments, the PT registers may correspond to the PML4, PDPT, PD and PT registers of an Intel processor architecture.

The guest physical address 308 may be translated or mapped to a host physical address 314 in host physical memory using a hierarchy of VMM controlled EPT registers (A through D) 312, a 4 level hierarchy in this example. An EPT pointer register (e.g., the EPTP register in some Intel processor architectures) may be configured to select a particular set of EPTs for any given address mapping. In some embodiments, the EPT registers may correspond to the PML4E (Page Map Level 4 Entry), PDPTE (Page Directory Pointer Table Entry), PDE (Page Directory Entry) and PTE (Page Table Entry) registers of an Intel processor architecture. Although not shown in the figure, for simplicity, each of the PT registers 306 may also be mapped through a set of EPT registers during the page walking process.

Figure 4:
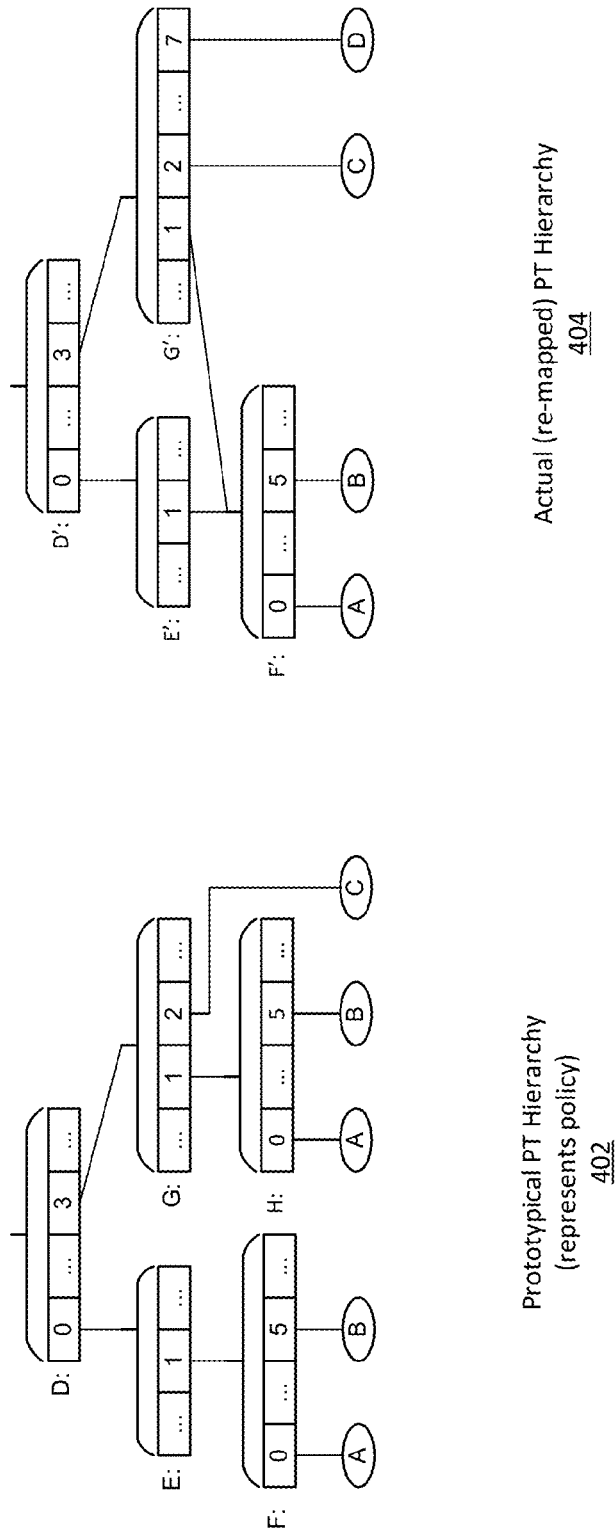
FIG. 4 illustrates a relationship preservation associated with a page table re-mapping consistent with an example embodiment of the present disclosure.

FIG. 4 illustrates a relationship preservation 400 associated with a page table re-mapping consistent with an example embodiment of the present disclosure. In some embodiments, operational policies may exist that lock certain GLAs to certain GPAs. One method to enforce this type of policy is to check that the actual page tables in use by the PMH are homomorphic (e.g., similar in form but different in structure) to a prototypical partial page table hierarchy. A "prototypical" page table is one that is not necessarily ever used by the PMH. Instead, it is used by the PTEC as a "standard" against which the actual page tables used by the PMH are compared. The prototype can be partial in that it need not contain a mapping for every linear address that the guest actually needs to use. It may only serve to map those addresses that are security-critical.

Different policies may be applicable in different contexts (e.g. processes, etc.), or a single policy may be applicable across multiple contexts. This means that in each view, each actual page table may be associated with one or more page tables in the policy. In the typical case, each actual page table will only be associated with one policy page table, but more complex cases are possible. That means that for each active page table entry that is mapped from an entry in the policy by the homomorphism, any referenced active page table's entries must be mapped from the corresponding entries in the policy by the homomorphism. In practice, it may not be required that a strict homomorphism is defined at all times, but rather a check may be performed to ensure that every actual active page table, page table entry, and data page is mapped by a homomorphism from the policy. It is also not required that every entity in the policy map to an actual entity at all times, so long as any overlapping parts of the active page tables and the policy page tables match. Non-overlapping parts are unconstrained by the policy, which both permits additional entries to be present in the actual page tables and does not require that the actual page tables have enough entries to match against all of the entries in the policy page tables. Furthermore, the two page table hierarchies (actual and prototypical) need not have identical structure. For example, FIG. 4 illustrates two page table hierarchies 402 and 404 for which a homomorphism can be defined that preserves the binary "descends from" relation from referenced page tables to parent page table entries (e.g. E descends from D[0] and E' descends from D'[0]) and the "maps-to" relation from leaf page table entries to the addresses of the data pages mapped by those entries (e.g. F[0] and F' [0] both map to A). The page table hierarchy 402 may represent the policy and the hierarchy 404 may represent the actual page tables. Note that the presence of an additional, unconstrained mapping to data page D in the actual page tables 404 is permitted by this definition.

The PTEC module 108 may be configured to enforce this policy for any page table entries that could possibly be used by the PMH to add a prohibited entry to the TLB. Specifically, those are the entries in memory that the PMH is able to access, as well as the entries in special paging-structure caches. For example, the PTEC may be implemented in a VMM that configures EPTs to restrict software and PMH access to page tables. Access to paging-structure caches may not be controlled by EPTs. Thus, the PTEC may be configured to control EPT permissions and to flush entries from paging-structure caches as needed to enforce the policy. The PTEC manages this process by placing each page table into one of 6 states, as illustrated in the table 500 of FIG. 5, for each combination of processor core and EPT view.

State 1 is referred to as an "Unrecognized" state 502. This state is unregulated by the PTEC 108 because it does not affect mapping policies while in this state (i.e., during a particular time period). In this state, a PT is either both entirely unconstrained and accessible to the PMH 104, or it is not accessible to the PMH (e.g., a code or data page).

State 2 is referred to as a "Recognized" state 504. This state is potentially readable by guest software 110 but is inaccessible to the PMH 104. The PTEC controls a page table in this state such that guest software is not allowed to modify it and the PMH is not allowed to use it. In some embodiment variations, the page table may or may not be readable by guest software, but this is not a security requirement. For example, if shadowing is used, two copies of the page table may exist at different guest physical addresses (one address to be used for software accesses and the other for PMH accesses). Likewise, if ghosting is used and two guest physical addresses refer to a single page table, different permissions can be applied to each guest physical address. One can be made readable by software and the other one can be made inaccessible to the PMH. However, if shadowing is not used only one copy of the page table exists at just one guest physical address, then read access by both the PMH and the guest software should be blocked, since the EPTs do not separate out the access permissions for the PMH versus the software for a single guest physical address.

State 3 is referred to as an "Inactive" state 506. This state is readable and writable by guest software but inaccessible to the PMH. This allows guest software to modify the page table freely, which means that the PMH should not be allowed to access it until the VMM performs a security check on those modifications to prevent the software from making unauthorized changes.

State 4 is referred to as an "Inactive Read-Only" state 508. This state is readable by guest software but inaccessible to the PMH. This state is similar to state 3 (Inactive), but the software is only allowed to read from the page table, not modify it. This state may be employed when only relatively limited shadowing is supported, as described below in connection with certain embodiments of the PTEC.

State 5 is referred to as an "Active" state 510. This state is potentially readable by guest software and is accessible to the PMH. In this state, security checks have been performed by the VMM and have determined that the linear mapping policies will be satisfied if the PMH is permitted to use this page table. In some embodiment variations, the page table may or may not be readable by guest software for the same reasons described in connection with state 2 (Recognize state) above.

State 6 is referred to as a "Live Editable" state 512. This state is readable and writable by guest software and is accessible to the PMH. The PTEC may limit the amount of time that the PT can be in this state so that changes made by guest software cannot be used by the PMH until they have been checked and approved. There may be occasions when an instruction that is editing a page table also causes the PMH to access that page table and use it to determine a linear mapping necessary for that same instruction to complete. Thus, special handling is needed to allow the page table to be used and updated by the same instruction. This may be handled by exiting back to the VMM after the instruction has completed, so that security checks can be performed before the updates to the page table can be used by the PMH.

Table 500 summarizes the guest software permissions and PMH access for each of the 6 states, where "Y" indicates that access must be permitted, "N" indicates access is denied, and "Y/N" indicates that access can either be permitted or denied Because some system architectures may impose limits on the ways in which memory accesses can be controlled (with respect to guest software access versus PMH access), some constraints may exist with regard to the enforcement of the states described above. For example, the Intel Virtual Technology (VT-x2) architecture does not permit a VMM to directly impose independent controls on guest software accesses and PMH accesses. Instead, both are controlled by a shared set of permission bits in the EPTs. This may result in overly-conservative access controls, such as blocking read accesses from guest software to Recognized page tables. However, possible future extensions to EPTs could be configured to enable finer-grained control. For example, additional bits could be added to EPT entries to control PMH accesses separately from guest software accesses. An "isPT" bit may be used on non-root page tables to indicate that they can be read and written by the PMH. An "isRoot" bit may be used on root page tables. A "verifyPT" bit may be applied to any page to instruct the PMH to check that any entries added to the TLB referencing that page must be entirely determined using page tables that are not authorized by software on the current processor core. This can permit the PTEC algorithm to allow guest software to write to other page tables without introducing a risk that an adversary could create unapproved mappings to the page marked with verifyPT. This may be required by some policies. Otherwise, for policies that disapprove some aliases, all mappings must be checked to ensure that only authorized aliases are activated.

Another dimension of access control granularity concerns the minimum size of a region of memory that can be regulated by the hardware access control mechanisms. Existing EPTs offer a minimum granularity of 4Kbytes, which prevents defining independent access controls for different parts of a single guest page table. However, future hardware extensions may be configured to offer Sub-Page Protection which could support finer-grained access controls. In that case, different parts of a single guest page table may simultaneously be in multiple states as defined above. This may also provide opportunities for associating other attributes with parts of a 4 Kbyte page. For example, some paging modes, such as PAE, use 32-byte root page tables, so supporting the isRoot attribute for fine-grained regions could support finer-grained control over which regions can actually be used as root page tables. If the hardware access control support is too coarse-grained to assign the isRoot attribute to individual PAE root page tables, then the isRoot attribute could be defined to allow only some 32-byte portion (e.g. the first 32-byte portion) in that region to be used as a root page table. Alternatively, it could be defined to allow any 32-byte portion of that region to be used as a root page table.

In some embodiments, linear mapping policies may be applied to multiple EPT views, and each page table can have a different state in each view. Identifiers that are mapped to state metadata are drawn from the cross product (i.e., all combinations) of the hardware processor core identifiers and the EPT view identifiers. For the purposes of this disclosure, metadata indicates the page table state, although in general, metadata may include any other useful data.

Figure 6:
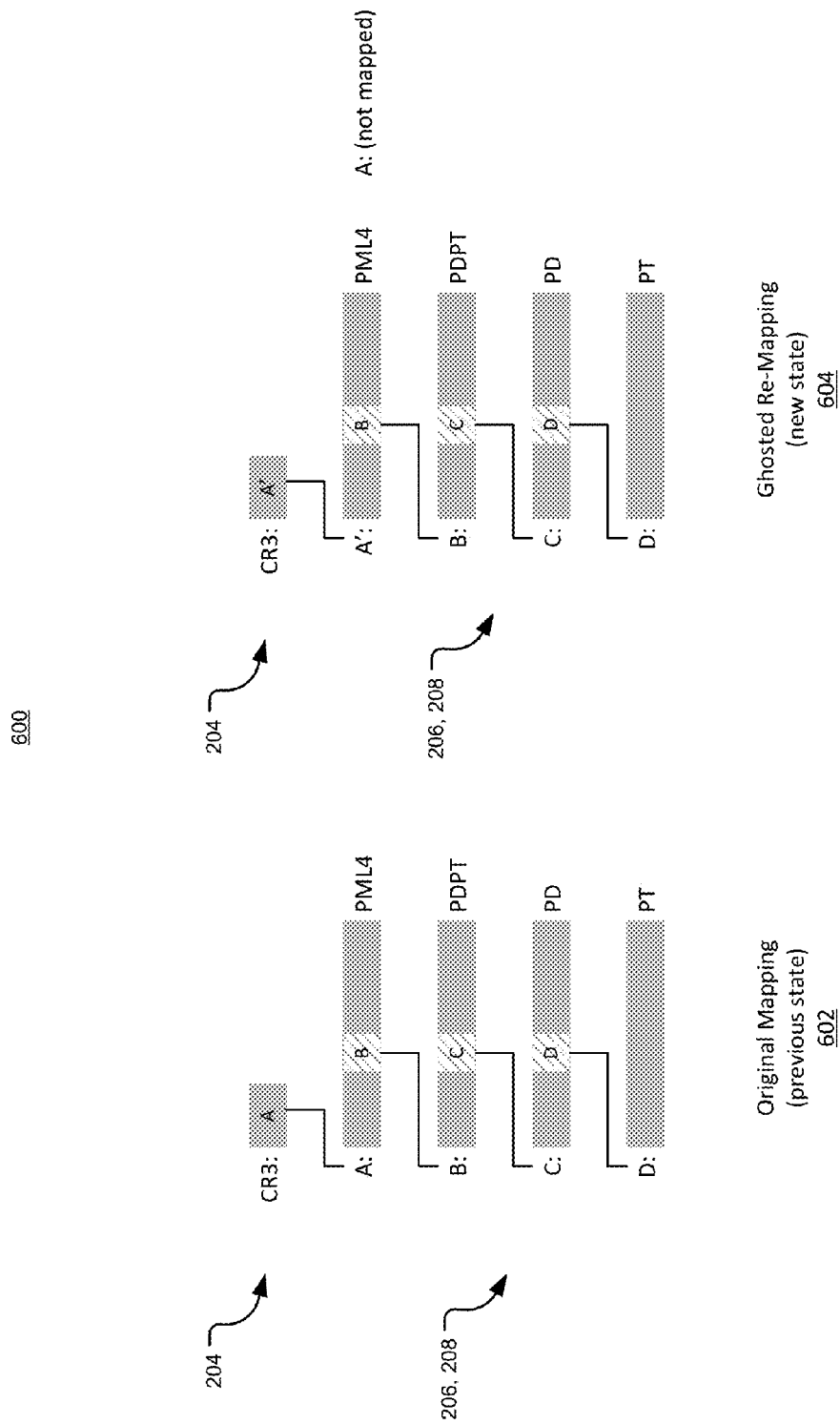
FIG. 6 illustrates page table ghosting consistent with an example embodiment of the present disclosure.

As previously discussed, hardware limitations on access control granularity may result in overly-conservative access controls, such as blocking read accesses from guest software to Recognized page tables. Alternatively, this situation may be dealt with by remapping a single page table to different guest physical addresses than may be expected by the guest software, a process referred to as "ghosting." FIG. 6 illustrates page table ghosting 600 consistent with an example embodiment of the present disclosure. In this example, an original mapping 602 of guest physical address A (GPA A) is re-mapped (or ghosted) 604 to a readable and writable GPA A'. GPA A is then unmapped, effectively preventing guest software from accessing the page table unless GPA A' can somehow be discovered by the guest software. The VMM, however, has access to both GPAs, so it can modify page table entries and CR3 values to reference GPAs that are ghosted in this way. Guest software can still operate correctly, since it may be prevented from directly accessing the modified values by hardware-enforced settings and the VMM can return the expected contents of the CR3 register (or a page table in memory) to the guest. Alternatively, the VMM can disable ghosting and allow the guest to retry the access. Thus, computationally expensive VM exits may be limited to a relatively small number of ghosted pages.

Figure 7:
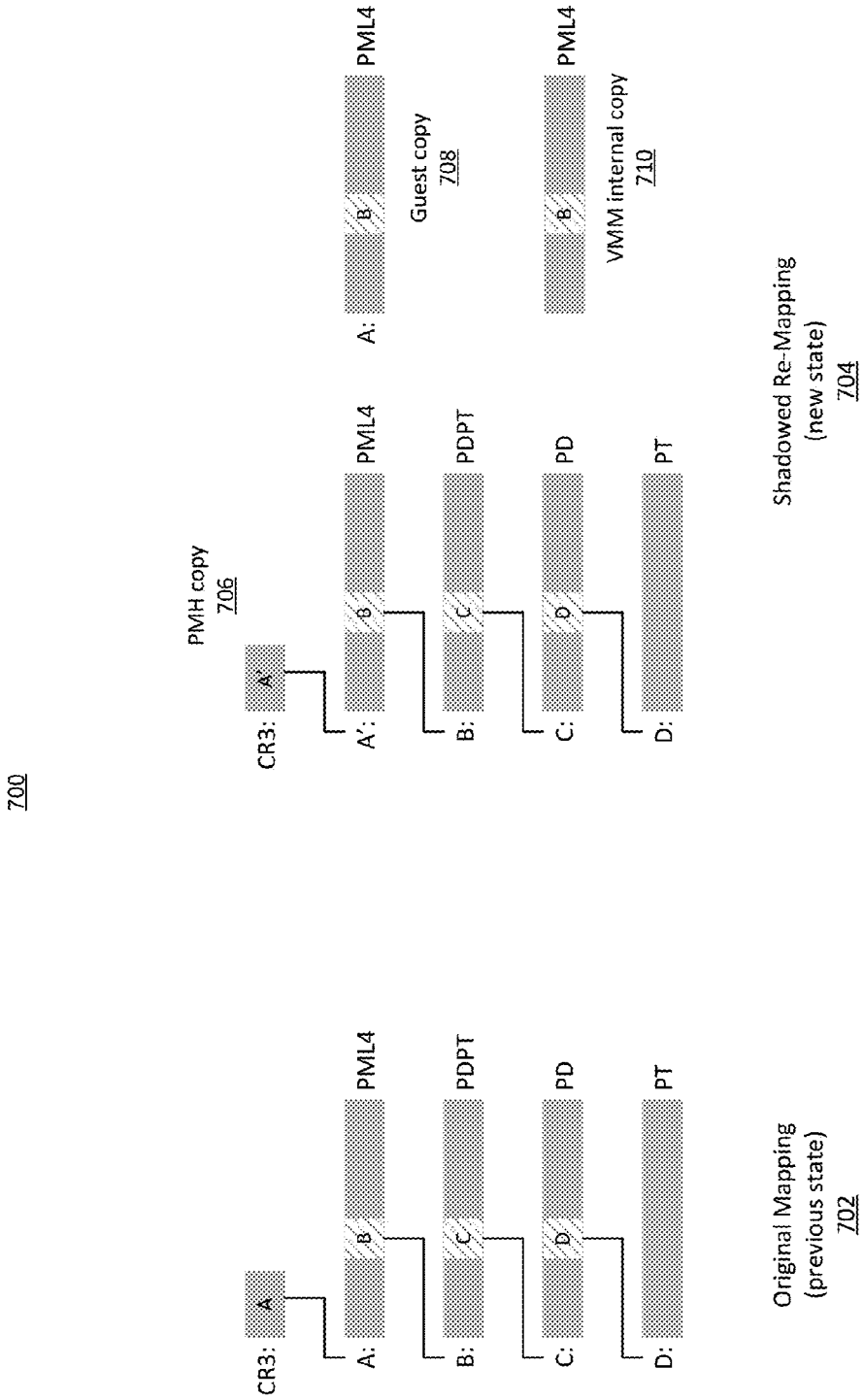
FIG. 7 illustrates page table shadowing consistent with an example embodiment of the present disclosure.

FIG. 7 illustrates page table shadowing 700 consistent with an example embodiment of the present disclosure. In some embodiments, page tables may be selectively shadowed and the copies mapped to different GPAs, so that both the PMH and guest software can operate on different views of a page table simultaneously, with potentially different permissions applied to each. Some page tables may require multiple shadow copies. For example, the VMM needs to track the original contents of the page table if it is Live Editable (so that it can compare the accessed and dirty bits in the original copy), in addition to the software-editable copy and the PMH-accessible copy, when computing a final combined state for the page table. The "accessed" bit is employed to indicate that the processor used the PT as part of a GLA to GPA translation. The "dirty" bit is employed to indicate that a write to a GPA occurred, where that PT was walked by the PMH as part of the process for computing the GPA. This requires that three copies 706, 708, 710 of the affected page table be maintained, as illustrated in FIG. 7, which shows the original mapping 702 and the shadowed re-mapping 704.

In some embodiments, root page tables may also be shadowed, requiring that the CR3 register be manipulated to point to the appropriate shadow. Whenever a page table is shadowed or ghosted, or when it transitions back to being non-shadowed (or non-ghosted), any page table entries and/or the CR3 register that reference that PT need to be updated to refer to the appropriate GPA. Another side-effect of shadowing or ghosting is that guest software and the PMH may generate EPT violations when attempting to access the GPA of the ghost or shadow PT. Thus, the VMM may be configured to maintain a secondary mapping from those GPAs to the associated page table metadata to be used when handling EPT violations.

Another situation requiring multiple copies is when a page table occurs at multiple levels within page table hierarchies. Page tables do not necessarily form strict tree structures, since loops may exist. A loop is formed when an entry in one page table references that same page table, or one of its ancestors. Without special handling, such loops can result in guest software having unauthorized access to shadow copies of page tables. Whichever page table is referenced by the entry within the loop that ends up at the deepest supported level within the page table hierarchy can be accessed through that entry.

Figure 8:
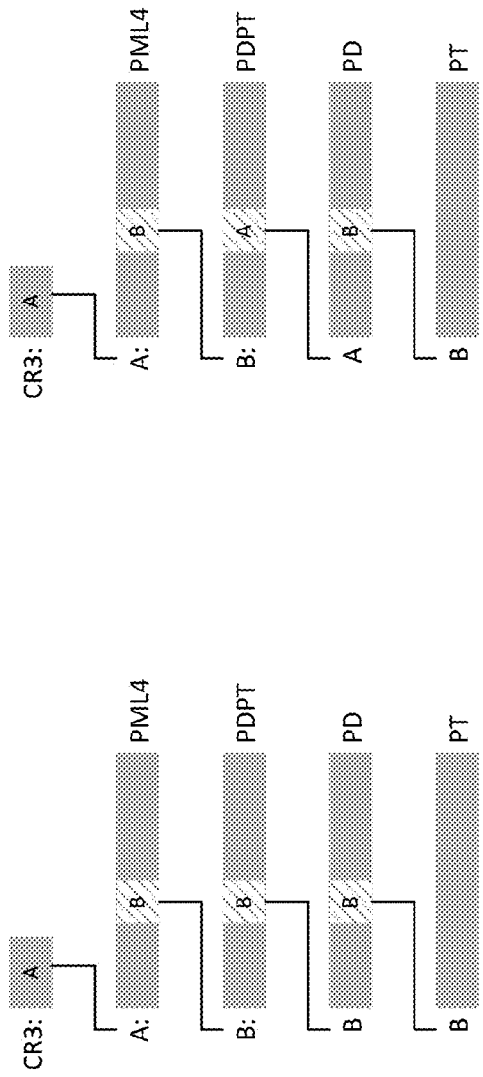
FIG. 8 illustrates page table loops consistent with an example embodiment of the present disclosure.

FIG. 8 illustrates two possible examples of looping 802, 804. In some embodiments, to avoid loops, the PTEC may create one shadow copy for each level on demand, as each level is accessed. One possible optimization would be to specifically check for loops and avoid creating copies for non-looping page tables. However, those checks would add complexity to the PTEC.

When a linear mapping policy is active, it may typically be necessary to track all CR3 values that are in use, since that register references the root of the guest page table hierarchy. In a VT-x embodiment, the CR3Target List (CR3-TL) feature can be used to reduce the overhead imposed by this requirement. It can be loaded with authorized CR3 values for page table hierarchies that are being controlled.

Some paging modes, for example the PAE paging mode, may need to be handled specially, since it operates differently from other 32 bit paging modes. Specifically, the root page tables are not necessarily page-aligned. They need only be aligned at 32-byte boundaries. Each of them is 32 bytes in length, since it contains only four page table entries that are each eight bytes in length. To account for this, the page table metadata in the VMM may contain a bit vector indicating which offsets within the page table are referenced by authorized CR3 values. Furthermore, the root page tables are loaded into PDPTE registers within the processor when the CR3 register is loaded, rather than when a code or data memory access is performed. Thus, it may only be necessary to check those values for policy compliance at the times when they are actually loaded into the PDPTE registers, and future policy checks for descendant page tables should be performed relative to the contents of those PDPTE registers rather than the memory contents of the root page tables.

One of the challenges associated with performing guest page table edit control is that numerous access demands may occur within a single instruction, which must all be satisfied in a relatively simultaneous manner. For instance, an instruction may seek to modify a page table while also requiring that the PMH read it to obtain a linear mapping that is needed to execute that same instruction. This can result in a sequence of EPT violations being generated during the execution of a single guest instruction, including violations induced by EPT modifications made in response to earlier EPT violations. To coordinate this process, the VMM may be configured to maintain information about each "epoch," which corresponds to the end-to-end execution of a single instruction. The epoch indicates the minimum permissions required on each page table. That information is used to determine an appropriate state setting for each affected page table. The epoch also maintains information about the CR3 value that will be in place at the end of the epoch. That may differ from the current CR3 value in the case of "load CR3" instructions.

When a page table is set to Active, the identities of its parent page tables, including the base virtual address at which the current page table is mapped by each of those parents and the current logical processor, may be stored with the metadata for the newly-activated page table. This metadata is also updated when a different parent page table, or the same parent page table on a different logical processor, is made Active, since each page table may have multiple parents. A corresponding update is performed when a parent page table is deactivated. When all of a page table's parents have been deactivated on all logical processors, the child page table state is set to Unrecognized (i.e., it is derecognized). However, a page table will not be derecognized as long as it is in the set of page tables allowed to be referenced directly by any logical processor's CR3 register, even if it has no parents. A CR3 register is considered to be the logical equivalent of a parent page table entry in this regard.

Figure 9A:
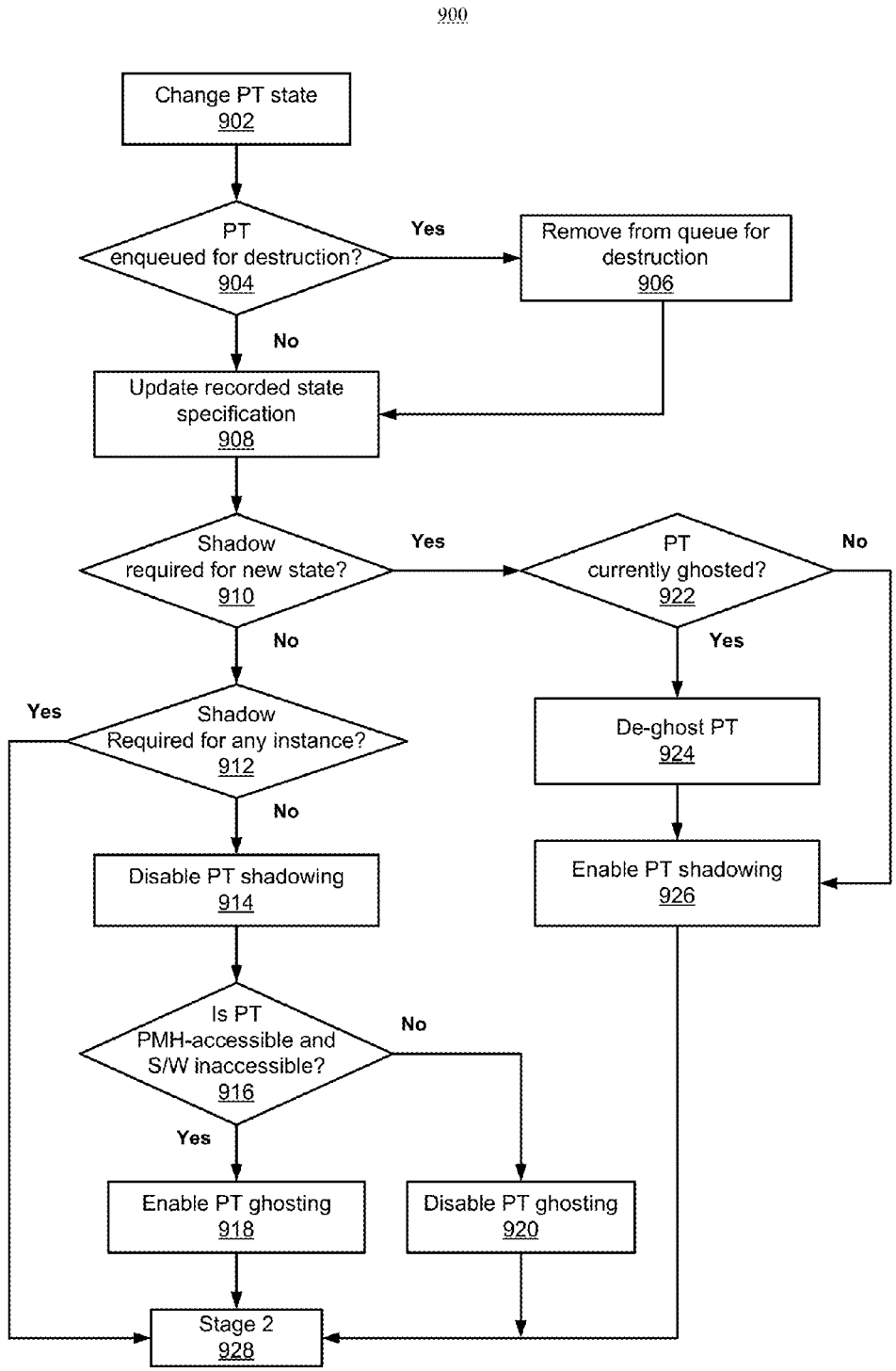
FIGS. 9A and 9B illustrate a flowchart of operations of another example embodiment consistent with the present disclosure.
Figure 9B:
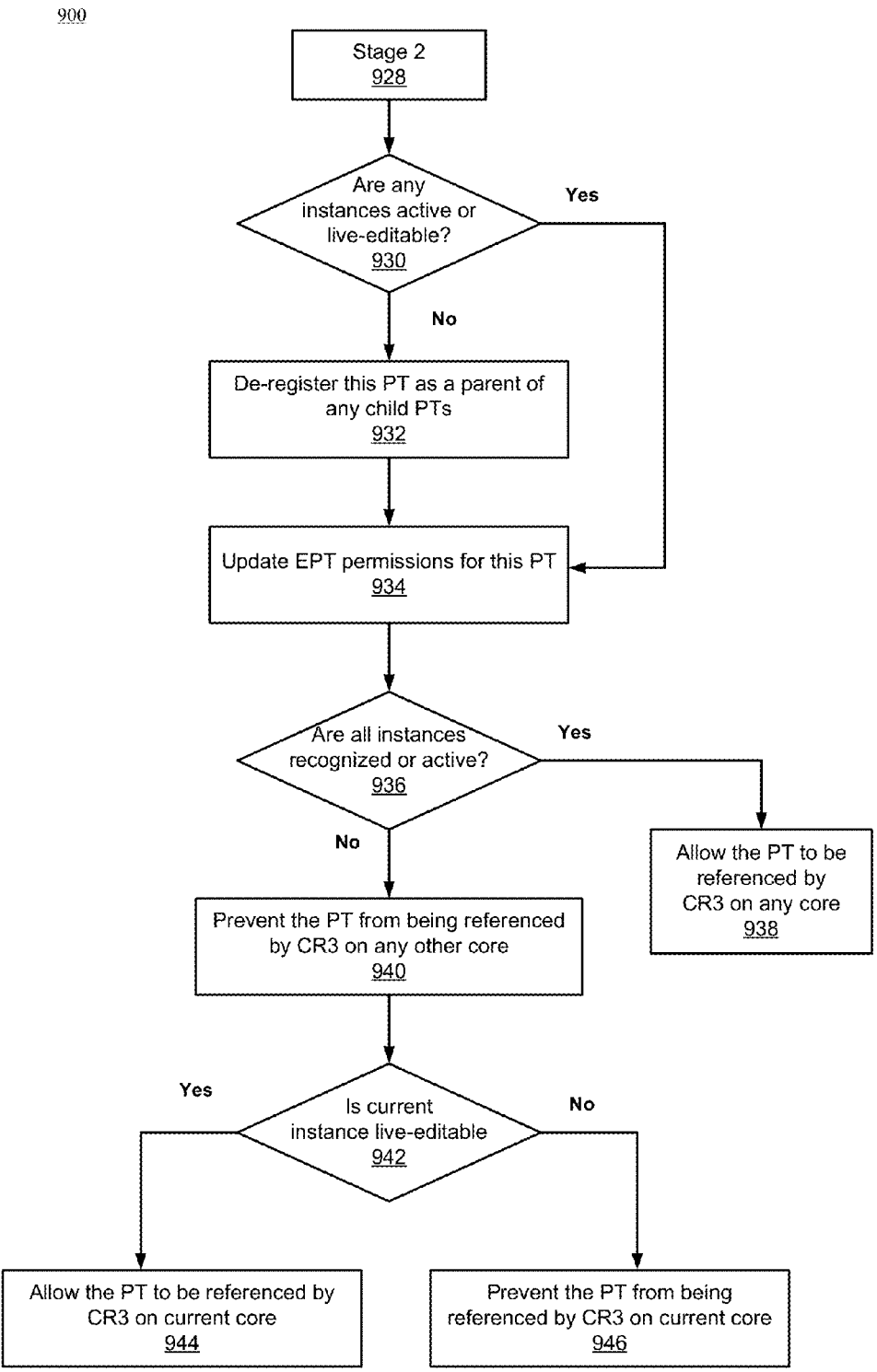

FIGS. 9A and 9B illustrate a flowchart of operations 900 of another example embodiment consistent with the present disclosure. A page table state change process 900, that is common to all possible transitions between the 6 states described above, is shown to begin at operation 902. The transitions are associated with an instance of a page table on a particular CPU and a particular view. If the PT was previously designated or enqueued for destruction, determined at operation 904, then the PT is removed, at operation 906, from the queue of metadata to be deleted at the end of processing for this event. Next, at operation 908, the recorded state for the page table instance is updated. At operation 910, a check is performed to determine whether a shadow is required for the page table instance in its new state. If so, then at operation 922, a check is performed to determine whether the page table is currently ghosted. If it is ghosted, then at operation 924, the PT is de-ghosted prior to enabling shadowing of the PT at operation 926.

If a shadow is not required for the PT instance in its new state, then a determination is made, at operation 912, as to whether any other instances of the page table on other CPUs (cores or hardware threads) and views require shadowing. If not, then at operation 914, any existing shadows of that page table are de-allocated. If shadowing is not required, but the PMH is allocated some access to the PT instance in the new state and software is not allocated such access, as determined at operation 916, then ghosting is enabled at operation 918. Otherwise, ghosting is disabled at operation 920, if ghosting was previously enabled.

Attention is directed now to the second stage 928 of the process, as shown in FIG. 9B. If the previous state is Live Editable or if the previous state is Active and no other instances of the page table are still active, as determined at operation 930, then the page table is deregistered, at operation 932, as a parent of any child page tables. The EPT permissions for the page table instance and any ghosts or shadows are then updated at operation 934. If the new state, as well as the current states of all other instances, are Recognized or Active, as determined at operation 936, then the page table is allowed to be referenced by the CR3 on any core, at operation 938, and the state change is completed (although this does not imply that the page table is added to the CR3 target list). Policy checks would need to be performed using that page table as a root if and when the guest actually attempts to reference it from CR3. Otherwise, at operation 940, the page table is prevented from being referenced by the CR3 on any other core. Continuing, at operation 942, if the current instance is Live-editable, then at operation 944, the page table is allowed to be referenced by CR3 on the current core, but not on any other cores since that could allow other threads to access unapproved changes made on the current core. Otherwise, at operation 946, the page table is prevented from being referenced by the CR3 on the current core.

Transitioning a page table instance to the Unrecognized state requires that the PT undergo the common state change update process (described above) for each instance of CPU and view combination. The metadata related to the PT's position in the homomorphism with the policy is then deleted, and it is added to the queue of page table metadata to be deleted at the completion the handling for the current event (e.g. EPT violation or load CR3 instruction). Immediate deletion could cause errors if it is still referenced by other metadata.

Transitioning a page table instance to the Recognized state requires no special processing beyond the common state change procedure.

Deactivating a page table instance (transitioning to the Inactive state) requires that PMH access to any instance of the page table be blocked before the common state change procedure is performed. This is necessary to insure that a page table is not editable in one instance while also being accessible to the PMH in some other instance, since that would risk allowing unapproved edits to take effect. Specifically, this means that if a page table instance is being made editable and is PMH accessible in some other instance, then it must be made inaccessible to the PMH in each such instance by being made Recognized. Conversely, this means that if a page table instance is being made PMH accessible (Active or Live Editable) and is also editable in some other instance (Inactive or Live Editable), then it must be made Recognized in the instances that are currently editable.

The handling of Inactive page tables may differ depending on the PTEC embodiment (e.g., algorithm in use). If it does not ghost Inactive page tables or otherwise block PMH access directly at the EPT level, then PMH access to Inactive page tables needs to be blocked in some other way to prevent usage of unapproved edits by guest software. One possible approach is to block PMH access to all parent page tables of the Inactive page table. Each parent of the page table is inspected to see if PMH access is required for that parent in the current epoch. If so, the Inactive (child) page table can be made Live Editable and the state of the parent page table can be left unmodified. Otherwise, the parent is made Recognized if no software access to the parent is required, or Inactive Read-Only or Inactive if software read or read/write access is required, respectively. Deactivating the parent page table may require recursive updates to its parents to similarly block PMH access to the newly-deactivated page table.

The most complex transition for a page table is to Active or Live Editable. The metadata for an Active or Live Editable page table indicates its shallowest level within any page table hierarchy, and that metadata is updated regardless of whether the page table is actually changing to a new state. The overall state transition function is invoked whenever the page table instance is activated due to a reference from any page table entry in the context of that instance, even if the page table is already Active. A single page table can be referenced by multiple page table hierarchies, and at multiple points within a single hierarchy. A page table can also reference itself. Sometimes the level of the page table instance is unknown when the state transition is performed. In that case, the shallowest level can be computed by walking through the lists of parents for the page table instance until reaching a page table that can be referenced by CR3. If some instance of the page table is currently editable (e.g., in any state in which guest software is allowed to write to it) then those edits are committed and further edits are blocked before proceeding. If the page table instance is in fact changing states, then the common state change procedure described previously is performed.

Next, the portion of the page table hierarchy rooted at the current page table is checked for conformance with the policy. Activation of a new page table instance is the only event that can potentially result in non-conformance, so the check is performed at this point. The policy check includes walking down the page table hierarchy and checking that the structures of the reference policy hierarchy and the actual hierarchy are equivalent according to the homomorphism defined earlier, and that the leaf nodes reference the same guest physical addresses. It is also possible to check attribute values if the policy specifies those (e.g. whether the page is accessible to user-mode software, whether it is writable, etc.). The conformance checker also updates references to policy page tables in the metadata for the actual page tables to which they map, to be used in future policy checking procedures rooted at those page tables.

Each page table that is referenced by an entry within this page table may then be processed recursively. If the parent page table entry refers back to the parent page table (i.e. the page table loops back to itself), that fact is noted in the page table metadata. Otherwise, the child page table is looked up. If the child page table was previously Unrecognized, it is initialized in the Recognized state on all instances, since it has now become potentially reachable by the PMH via its Active or Live Editable parent. Otherwise, its processing will vary based on its current state and the existing access demands noted in the current epoch. For example, if it is already Active in the current instance, it will remain Active and the re-activation procedure will be recursively invoked for its newly-registered position in the current page table hierarchy. If the parent page table is shadowed or ghosted, the page table entries that reference page tables are updated to point to the appropriate ghosted or shadowed addresses.

When a page table transitions to being Live Editable, it is additionally noted in a centralized metadata so that it can be processed appropriately after the live edit is completed. The term "centralized metadata" is used to indicate that the metadata is stored in a single location instead of being indexed by the address of the associated page table, as would typically be the case. This also results in the Machine Trap Flag (MTF) being enabled. This is used to single-step the execution of the guest software and provides an opportunity to check any page table edits before they can take effect, even though simultaneous read and write access to some page tables is provided during that single step. For example, the MTF handler may transition the Live Editable page tables to being Recognized when the single step is completed.

An alternative to using single-stepping is to decode and emulate the faulting instruction in the VMM. This may or may not be faster than single-stepping the instruction, depending on the configuration of the relevant software and hardware. It may possibly improve performance by reducing the number of VM exits. Single-stepping may reduce the size of the trusted-code base by eliminating emulation code. Single-stepping may also allow system software to operate on hardware with instructions added after the hypervisor was developed.

Whenever transitioning away from the Active or Live Editable states, the PTEC algorithm needs to invalidate any entries in the paging-structure caches that were drawn from that page table.

When an EPT violation occurs, a database of page table metadata is checked to see whether the EPT violation was caused by an access to a controlled page table. If so, the information provided to the MTF handler about the access that was attempted determines how the event is handled. The handler updates the current epoch with that information and uses it to determine which states each page table should be in to satisfy all of the access demands in the epoch. The handler also attempts to predict additional access demands that will occur within the epoch, since that may reduce the number of additional EPT violations that will occur within the epoch. This may be accomplished by performing emulated guest page table walks for the known guest linear addresses being accessed within the epoch to predict any additional relevant accesses to page tables from the PMH and software that may occur.

In some embodiments, rather than manipulating EPT permissions for a large number of guest page tables, the accessed and dirty bits within the guest page tables themselves may be manipulated to regulate guest linear to guest physical mappings by detecting accesses to the guest page tables. This may introduce less overhead than the previous solution by allowing the PMH to access page tables unimpeded while still blocking some software accesses, particularly if an OS only maps page tables in a contiguous linear region so that only relatively few page tables mapping that region need to be controlled using EPTs. The linear address regions mapping page tables are collectively referred to as the page table aperture.

In some embodiments the PTEC may be configured to allow for "transactional" processing, as will be described in greater detail below. Transactional processing may be applied in a manner analogous to the previously-described approach for directly controlling page table access using EPTs.

In transactional processing the VMM may be configured to define two EPT views, corresponding to two EPT hierarchies. In the first view, "View #1," the page tables with entries mapping the same or other page tables are marked as read-only using EPTs, and the protected pages (security-critical libraries and VMFUNC pages mapped in the EPTs) are marked as readable and writable using EPTs. VMFUNC is a virtual machine function instruction that may typically be used to switch between views. In the second view, "View #2," the page tables defining the page table aperture are marked as writeable in the EPTs, and all the Protected GPAs are inaccessible (not readable, writable, or executable).

When entering View #1, all dirty bits in the page table aperture are cleared and all linear to physical mappings in all page tables are verified. In particular, this is used to check that the entire page table aperture has been identified, all dirty bits within it have been cleared, and any page table forming part of the aperture has been marked non-writable in the EPTs for View #1.

When an attempt is made by the OS to edit a page table, an EPT violation will be triggered when the PMH attempts to set the dirty bit for the page table, since the EPTs block access to write the dirty bit. The VMM may be configured to handle this event by switching to View #2, in which the page tables for the page table aperture are writable, so that the dirty bit can be updated. View #2 may be configured so that a VMFUNC instruction execution causing transition from View #2 (the page table editing view) to View #1 (or any other fixed view) is not allowed. The EPTP List is disabled in the VM control data structures (VMCS) when in View #2. The VMCS are configured to manage transitions into and out of VMX root mode. If one core enters View #2, all cores enter View #2. When leaving View #2 all cores leave View #2 and the EPTP List is restored in the VMCS. This avoids a situation where an OS running on one core could edit the page tables such that another core's PMH uses those edits before they can be validated during the switch to View #1. Any attempt to access Protected GPAs would trigger an EPT violation that would be handled by the VMM performing the procedure to switch back to View #1.

In some embodiments, an optimization may be achieved by configuring the VMM to set the dirty bits in the page table aperture corresponding to the page tables that should be editable on that core and resuming that core in a new view, referred to as View #3. This may eliminate the need to force all cores into page table editing mode simultaneously. In View #3, protected GPAs are marked inaccessible and the page table aperture page tables are marked read-only. The page tables that should be editable are marked writable, and all other pages tables are marked non-writable. Any page table entry referring to an editable page table has its access bit cleared so that any attempt to use the editable page table through that entry generates an EPT violation when the PMH attempts to set the accessed bit. The page table containing such an entry with a cleared accessed bit must be marked non-writable in all views, and page table invalidations must be performed on all cores to ensure that neither a set accessed bit nor a writable EPT mapping for that page table is in place. Furthermore, whenever a page table is made editable, it must not be directly referenced by any CR3 register on any core. If it is not possible or practical to meet these requirements, it may be necessary to instead implement the dual view transactional approach described previously.

In some embodiments, writes through the page table aperture may be detected more efficiently by setting all the page table entries in the aperture to read-only. This then allows use of VT-x page fault VM exit filtering features to trap only page faults due to supervisor mode writes to present pages. This would avoid the need to mark page tables in the page table aperture as non-writable and to clear the dirty bits in the aperture. When the VMM needs to authorize writes through some portion of the aperture, it may set the relevant page table entries in the aperture to allow write access and then single-step the access so that the edits can be checked against the policy before being used or to decode and emulate the instruction editing the page tables.

In some embodiments, another possible optimization may be implemented that avoids the need for monitoring of CR3 values. This may be achieved by configuring GPA spaces to be non-overlapping between views, with the exception of CR3 values that are asserted as being safe to use in protected views. If an untrusted view loads a CR3 with a non-asserted root page table pointer, the PMH would generate an EPT violation when attempting to access that root page table in the trusted view. The VMFUNC instruction leaf for switching EPTPs may be used to switch between multiple different views.

However, additional controls may be needed if PAE or PCIDs are in use. In PAE mode, the PDPTE registers do not reload during VMFUNC execution, so the untrusted view could pre-load them with disallowed values in a manner that would be undetectable, thus making this approach unsuitable. If the same PCID is used in the trusted and untrusted view, the untrusted view could create a mapping, at some linear address in the trusted view at which it wants to execute, to a different GPA than is used in the trusted view. Thus, software in the untrusted view could insert a VMFUNC instruction into the trusted view at some linear address on that page and then use a cached mapping in the trusted view without attempting to re-walk from the CR3 value that is invalid in the trusted view. This could be mitigated by flushing all mappings for the current PCID prior to exiting the trusted view. Another possibility is to use a CR3 target list to contain approved CR3 values, which include their associated PCIDs. The VMM could also be configured to simply disable PCIDs.

FIG. 10 illustrates a flowchart of operations 1000 of another example embodiment consistent with the present disclosure. The operations provide a method for dynamically controlling access to guest PTs by VM guest software through the manipulation of EPTs. At operation 1010, a policy is maintained to lock one or more guest linear addresses (GLAs) to one or more allowable guest physical addresses (GPAs). At operation 1020, entries of the guest page tables are identified that map GLAs associated with the policy to a first GPA. At operation 1030, it is verified that the mapping conforms to the policy. At operation 1040, the guest page table is placed into one of a plurality of restricted accessibility states based on the verification. The restricted accessibility is enforced by Extended Page Table (EPT) permissions and applied to the VM guests and to a page walk processor.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hard-wired circuitry, programmable circuitry, state machine circuitry, and/or firmware that stores instructions executed by programmable circuitry.

An application (or "App") may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip. In some embodiments, a module may thus be implemented in software and/or firmware and may comprise one or more processes, threads or subroutines of a single process. Additionally, in some embodiments, a module may be distributed and executed on separate devices.

Thus, the present disclosure provides systems, methods and computer readable media for a dynamic page table edit controller configured to control access to guest page tables (PTs) by virtual machine (VM) guest software through the manipulation of extended page tables (EPTs). The following examples pertain to further embodiments.

According to Example 1 there is provided a system for controlling access by virtual machine (VM) guests to guest page tables. The system may include a translation look-aside buffer (TLB) to maintain a policy to lock one or more guest linear addresses (GLAs) to one or more allowable guest physical addresses (GPAs); a page walk processor to update the TLB based on the guest page tables; and a page table edit control (PTEC) module. The PTEC moduel may be configured to: identify entries of the guest page tables that map GLAs associated with the policy to a first GPA; verify that the mapping conforms to the policy; and place the guest page table into one of a plurality of restricted accessibility states based on the verification, the restricted accessibility enforced by Extended Page Table (EPT) permissions and applied to the VM guests and to the page walk processor.

Example 2 may include the subject matter of Example 1, and the PTEC module is incorporated in a virtual machine monitor (VMM) executing in a virtual-machine extensions (VMX) root mode of the system.

Example 3 may include the subject matter of Examples 1 and 2, and the PTEC module enforces the restricted accessibility states by controlling EPT views of the guest page tables.

Example 4 may include the subject matter of Examples 1-3, and the identifying is limited to guest page tables associated with security of the system.

Example 5 may include the subject matter of Examples 1-4, and the PTEC module is further to create a copy of the guest page table at a second GPA.

Example 6 may include the subject matter of Examples 1-5, and the PTEC module is further to remap the guest page table to a second GPA, the second GPA inaccessible to the VM guests.

Example 7 may include the subject matter of Examples 1-6, and one of the plurality of restricted accessibility states permits the VM guest to read and write from the guest page table and further permits the page walk processor to access the guest page table.

Example 8 may include the subject matter of Examples 1-7, and one of the plurality of restricted accessibility states prohibits the VM guest from writing to the guest page table and further prohibits the page walk processor from accessing the guest page table.

Example 9 may include the subject matter of Examples 1-8, and one of the plurality of restricted accessibility states permits the VM guest to read and write from the guest page table and further prohibits the page walk processor from accessing the guest page table.

Example 10 may include the subject matter of Examples 1-9, and one of the plurality of restricted accessibility states permits the VM guest to read from the guest page table, prohibits the VM guest from writing to the guest page table and further prohibits the page walk processor from accessing the guest page table.

Example 11 may include the subject matter of Examples 1-10, and one of the plurality of restricted accessibility states permits the VM guest to read from the guest page table, prohibits the VM guest from writing to the guest page table and further permits the page walk processor to access the guest page table.

According to Example 12 there is provided a method for controlling access by virtual machine (VM) guests to guest page tables, the method including: The method may include: maintaining a policy to lock one or more guest linear addresses (GLAs) to one or more allowable guest physical addresses (GPAs); identifying entries of the guest page tables that map GLAs associated with the policy to a first GPA; verifying that the mapping conforms to the policy; and placing the guest page table into one of a plurality of restricted accessibility states based on the verification, the restricted accessibility enforced by Extended Page Table (EPT) permissions and applied to the VM guests and to a page walk processor.

Example 13 may include the subject matter of Example 12, and the restricted accessibility is enforced by controlling EPT views of the guest page tables.

Example 14 may include the subject matter of Examples 12 and 13, and the identifying is limited to guest page tables associated with security of the VM.

Example 15 may include the subject matter of Examples 12-14, further including creating a copy of the guest page table at a second GPA.

Example 16 may include the subject matter of Examples 12-15, further including remapping the guest page table to a second GPA, the second GPA inaccessible to the VM guests.

Example 17 may include the subject matter of Examples 12-16, and one of the plurality of restricted accessibility states permits the VM guest to read and write from the guest page table and further permits the page walk processor to access the guest page table.

Example 18 may include the subject matter of Examples 12-17, and one of the plurality of restricted accessibility states prohibits the VM guest from writing to the guest page table and further prohibits the page walk processor from accessing the guest page table.

Example 19 may include the subject matter of Examples 12-18, and one of the plurality of restricted accessibility states permits the VM guest to read and write from the guest page table and further prohibits the page walk processor from accessing the guest page table.

Example 20 may include the subject matter of Examples 12-19, and one of the plurality of restricted accessibility states permits the VM guest to read from the guest page table, prohibits the VM guest from writing to the guest page table and further prohibits the page walk processor from accessing the guest page table.

Example 21 may include the subject matter of Examples 12-20, and one of the plurality of restricted accessibility states permits the VM guest to read from the guest page table, prohibits the VM guest from writing to the guest page table and further permits the page walk processor to access the guest page table.

According to Example 22 there is provided at least one computer-readable storage medium having instructions stored thereon which when executed by a processor result in the following operations for controlling access by virtual machine (VM) guests to guest page tables. The operations may include: maintaining a policy to lock one or more guest linear addresses (GLAs) to one or more allowable guest physical addresses (GPAs); identifying entries of the guest page tables that map GLAs associated with the policy to a first GPA; verifying that the mapping conforms to the policy; and placing the guest page table into one of a plurality of restricted accessibility states based on the verification, the restricted accessibility enforced by Extended Page Table (EPT) permissions and applied to the VM guests and to a page walk processor.

Example 23 may include the subject matter of Example 22, and the restricted accessibility is enforced by controlling EPT views of the guest page tables.

Example 24 may include the subject matter of Examples 22 and 23, and the identifying is limited to guest page tables associated with security of the VM.

Example 25 may include the subject matter of Examples 22-24, further including creating a copy of the guest page table at a second GPA.

Example 26 may include the subject matter of Examples 22-25, further including remapping the guest page table to a second GPA, the second GPA inaccessible to the VM guests.

Example 27 may include the subject matter of Examples 22-26, and one of the plurality of restricted accessibility states permits the VM guest to read and write from the guest page table and further permits the page walk processor to access the guest page table.

Example 28 may include the subject matter of Examples 22-27, and one of the plurality of restricted accessibility states prohibits the VM guest from writing to the guest page table and further prohibits the page walk processor from accessing the guest page table.

Example 29 may include the subject matter of Examples 22-28, and one of the plurality of restricted accessibility states permits the VM guest to read and write from the guest page table and further prohibits the page walk processor from accessing the guest page table.

Example 30 may include the subject matter of Examples 22-29, and one of the plurality of restricted accessibility states permits the VM guest to read from the guest page table, prohibits the VM guest from writing to the guest page table and further prohibits the page walk processor from accessing the guest page table.

Example 31 may include the subject matter of Examples 22-30, and one of the plurality of restricted accessibility states permits the VM guest to read from the guest page table, prohibits the VM guest from writing to the guest page table and further permits the page walk processor to access the guest page table.

According to Example 32 there is provided a system for controlling access by virtual machine (VM) guests to guest page tables. The system may include: means for maintaining a policy to lock one or more guest linear addresses (GLAs) to one or more allowable guest physical addresses (GPAs); means for identifying entries of the guest page tables that map GLAs associated with the policy to a first GPA; means for verifying that the mapping conforms to the policy; and means for placing the guest page table into one of a plurality of restricted accessibility states based on the verification, the restricted accessibility enforced by Extended Page Table (EPT) permissions and applied to the VM guests and to a page walk processor.

Example 33 may include the subject matter of Example 32, and the restricted accessibility is enforced by controlling EPT views of the guest page tables.

Example 34 may include the subject matter of Examples 32 and 33, and the identifying is limited to guest page tables associated with security of the VM.

Example 35 may include the subject matter of Examples 32-34, further including means for creating a copy of the guest page table at a second GPA.

Example 36 may include the subject matter of Examples 32-35, further including means for remapping the guest page table to a second GPA, the second GPA inaccessible to the VM guests.

Example 37 may include the subject matter of Examples 32-36, and one of the plurality of restricted accessibility states permits the VM guest to read and write from the guest page table and further permits the page walk processor to access the guest page table.

Example 38 may include the subject matter of Examples 32-37, and one of the plurality of restricted accessibility states prohibits the VM guest from writing to the guest page table and further prohibits the page walk processor from accessing the guest page table.

Example 39 may include the subject matter of Examples 32-38, and one of the plurality of restricted accessibility states permits the VM guest to read and write from the guest page table and further prohibits the page walk processor from accessing the guest page table.

Example 40 may include the subject matter of Examples 32-39, and one of the plurality of restricted accessibility states permits the VM guest to read from the guest page table, prohibits the VM guest from writing to the guest page table and further prohibits the page walk processor from accessing the guest page table.

Example 41 may include the subject matter of Examples 32-40, and one of the plurality of restricted accessibility states permits the VM guest to read from the guest page table, prohibits the VM guest from writing to the guest page table and further permits the page walk processor to access the guest page table.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for transitioning an instance of a page table from a first state to a second state of a plurality of restricted accessibility states, the system comprising:
    a processor;
    a page table pointer register; and
    page table edit control (PTEC) circuitry to:
        update, based at least on the second state, a recorded state of the instance of the page table;
        update, based at least on the second state, extended page table (EPT) permissions of the instance of the page table; and
        update, based at least on the second state, reference permission of the page table, the reference permission to indicate whether the page table pointer register has permission to reference the page table on at least one core of the processor.

2. The system of claim 1, wherein the PTEC circuitry is further to:
    determine whether the instance of the page table is on a deletion queue; and
    responsive to a determination that the instance of the page table is on the deletion queue, remove the instance of the page table from the deletion queue.

3. The system of claim 1, wherein the PTEC circuitry is further to:
    determine, based at least on the second state, whether the instance of the page table requires a shadow instance; and
    responsive to a determination that the instance of the page table requires a shadow instance, create a shadow instance of the page table, the shadow instance having a different guest physical address (GPA) than the instance of the page table.

4. The system of claim 3, wherein, responsive to a determination that the instance of the page table does not require a shadow instance, the PTEC circuitry is further to:
    determine whether any of a plurality of other instances of the page table require a shadow instance; and
    responsive to a determination that none of the plurality of other instances of the page table require a shadow instance, identify and deallocate any shadow instances of the page table.

5. The system of claim 1, wherein the PTEC circuitry is further to:
    determine a state of each of a plurality of other instances of the page table; and
    update, based at least on the states of the other instances and on the first state, a registration of the page table as a parent of at least one child page table.

6. The system of claim 1, wherein one of the plurality of restricted accessibility states permits a virtual machine (VM) guest to read and write from the page table and further permits a page walk processor to access the page table.

7. The system of claim 1, wherein one of the plurality of restricted accessibility states prohibits a virtual machine (VM) guest from writing to the page table and further prohibits a page walk processor from accessing the page table.

8. The system of claim 1, wherein one of the plurality of restricted accessibility states permits a virtual machine (VM) guest to read and write from the page table and further prohibits a page walk page walk processor from accessing the page table.

9. The system of claim 1, wherein one of the plurality of restricted accessibility states permits a virtual machine (VM) guest to read from the page table, prohibits the VM guest from writing to the page table and further prohibits a page walk processor from accessing the page table.

10. The system of claim 1, wherein one of the plurality of restricted accessibility states permits a virtual machine (VM) guest to read from the page table, prohibits the VM guest from writing to the page table and further permits a page walk processor to access the page table.

11. A method for transitioning an instance of a page table from a first state to a second state of a plurality of restricted accessibility states, the method comprising:
    updating, via page table edit control (PTEC) circuitry based at least on the second state, a recorded state of the instance of the page table;
    updating, via the PTEC circuitry based at least on the second state, extended page table (EPT) permissions of the instance of the page table; and
    updating, via the PTEC circuitry based at least on the second state, reference permission of the page table, the reference permission to indicate whether the page table pointer register has permission to reference the page table on at least one core of the processor.

12. The method of claim 11, further comprising:
    determining, via the PTEC circuitry, whether the instance of the page table is on a deletion queue; and
    responsive to a determination that the instance of the page table is on the deletion queue, removing the instance of the page table from the deletion queue.

13. The method of claim 11, further comprising:
    determining, via the PTEC circuitry based at least on the second state, whether the instance of the page table requires a shadow instance; and responsive to a determination that the instance of the page table requires a shadow instance, creating a shadow instance of the page table, the shadow instance having a different guest physical address (GPA) than the instance of the page table.

14. The method of claim 13 further comprising, responsive to a determination that the instance of the page table does not require a shadow instance:
determining, via the PTEC circuitry, whether any of a plurality of other instances of the page table require a shadow instance; and
responsive to a determination that none of the plurality of other instances of the page table require a shadow instance, identifying and deallocating any shadow instances of the page table.

15. The method of claim 11, further comprising:
determining, via the PTEC circuitry, a state of each of a plurality of other instances of the page table; and
updating, via the PTEC circuitry based at least on the states of the other instances and on the first state, a registration of the page table as a parent of at least one child page table.

16. At least one non-transitory computer-readable storage medium having instructions stored thereon which, when executed by at least one processor, cause the at least one processor to perform operations for transitioning an instance of a page table from a first state to a second state of a plurality of restricted accessibility states, the operations comprising:
update, based at least on the second state, a recorded state of the instance of the page table;
update, based at least on the second state, extended page table (EPT) permissions of the instance of the page table; and
update, based at least on the second state, reference permission of the page table, the reference permission to indicate whether the page table pointer register has permission to reference the page table on at least one core of the processor.

17. The at least one non-transitory computer readable storage medium of claim 16, wherein the instructions, when executed by the at least one processor, cause the at least one processor to perform additional operations comprising:
determine whether the instance of the page table is on a deletion queue; and
responsive to a determination that the instance of the page table is on the deletion queue, remove the instance of the page table from the deletion queue.

18. The at least one non-transitory computer readable storage medium of claim 16, wherein the instructions, when executed by the at least one processor, cause the at least one processor to perform additional operations comprising:
determine, based at least on the second state, whether the instance of the page table requires a shadow instance; and
responsive to a determination that the instance of the page table requires a shadow instance, create a shadow instance of the page table, the shadow instance having a different guest physical address (GPA) than the instance of the page table.

19. The at least one non-transitory computer readable storage medium of claim 18, wherein the instructions, when executed by the at least one processor, cause the at least one processor to perform additional operations comprising:
responsive to a determination that the instance of the page table requires a shadow instance:
determine whether any of a plurality of other instances of the page table require a shadow instance; and
responsive to a determination that none of the plurality of other instances of the page table require a shadow instance, identify and deallocate any shadow instances of the page table.

20. The at least one non-transitory computer readable storage medium of claim 16, wherein the instructions, when executed by the at least one processor, cause the at least one processor to perform additional operations comprising:
determine a state of each of a plurality of other instances of the page table; and
update, based at least on the states of the other instances and on the first state, a registration of the page table as a parent of at least one child page table.

* * * * *